United States Patent
Groso et al.

(10) Patent No.: US 7,597,117 B1
(45) Date of Patent: Oct. 6, 2009

(54) COMPRESSION PLUG SYSTEM FOR TUBES AND PIPES

(75) Inventors: Jose M. Groso, Miami, FL (US); Carlos Aulet, 12101 SW. 184 St., Miami, FL (US) 33177

(73) Assignee: Carlos Aulet, Miami, FL (US)

( * ) Notice: Subject to any disclaimer, the term of this patent is extended or adjusted under 35 U.S.C. 154(b) by 69 days.

(21) Appl. No.: 11/684,180

(22) Filed: Mar. 9, 2007

(51) Int. Cl.
*F16L 55/10* (2006.01)

(52) U.S. Cl. .................. 138/89; 138/96 R; 285/23; 285/343

(58) Field of Classification Search .................. 138/89, 138/96 R, 89.4; 285/23, 343
See application file for complete search history.

(56) References Cited

U.S. PATENT DOCUMENTS

| | | | |
|---|---|---|---|
| 658,313 A | 9/1900 | Bernardi | |
| 888,683 A | 5/1908 | Andrews | |
| 2,029,325 A * | 2/1936 | Kocher | 285/341 |
| 2,182,811 A * | 12/1939 | Kocher | 285/3 |
| 2,250,517 A * | 7/1941 | Zolleis | 285/342 |
| 2,309,719 A * | 1/1943 | Locke Vaill | 285/222.5 |
| 2,434,846 A * | 1/1948 | Hagan | 285/8 |
| 2,693,374 A * | 11/1954 | Wurzburger | 285/343 |
| 2,801,023 A | 7/1957 | Baker et al. | |
| 3,498,647 A * | 3/1970 | Schroder | 285/343 |
| 3,889,989 A * | 6/1975 | Legris | 285/341 |
| 3,907,335 A * | 9/1975 | Burge et al. | 285/23 |
| 4,542,642 A * | 9/1985 | Tagliarino | 73/40.5 R |
| 4,621,841 A * | 11/1986 | Wakefield | 285/139.2 |
| 5,104,150 A * | 4/1992 | Bard et al. | 285/12 |
| 6,062,263 A | 5/2000 | Donovan et al. | |
| 6,382,683 B1 * | 5/2002 | Albright et al. | 285/330 |
| 2003/0111125 A1 * | 6/2003 | Johnson et al. | 138/90 |
| 2006/0237962 A1 * | 10/2006 | Anderson et al. | 285/23 |

* cited by examiner

*Primary Examiner*—James F Hook
(74) *Attorney, Agent, or Firm*—Albert Bordas, P.A.

(57) ABSTRACT

A compression plug system for plumbing, comprising a plumbing pipe, a slip nut, a seal ring, and a plug. The plug comprises a head having a closed end, and an external threaded portion having an edge. Extending from the head is the external threaded portion that extends to the edge. The external threaded portion has a cooperative dimension to engage with an internal threaded portion of the slip nut. The plug also has an internal wall that extends from the edge until an internal end. The plug further comprises an opening defining a cavity therein that reaches the internal end. The internal wall has substantially a same diameter as the internal wall of the seal ring. The compression plug system for plumbing creates an impermeable seal without the aid of a sealing compound or weld.

1 Claim, 3 Drawing Sheets

COMPRESSION PLUG SYSTEM FOR TUBES AND PIPES

BACKGROUND OF THE INVENTION

1. Field of the Invention

The present invention relates to plumbing systems, and more particularly, to compression plug systems for plumbing.

2. Description of the Related Art

When performing plumbing repairs or installation, plugging or capping a pipe seems to be a relatively simple operation under normal conditions. However, often times a plumber has a multitude of variables to deal with, such as, but not limited to, overcoming water pressure within the piping and the necessity to weld plugs and/or caps thereon.

Most structural construction regulations require that plumbing systems be pressure tested for leaks prior to entering service. Such tests require that sections, or complete plumbing systems, be pressurized and inspected for leaks. Often times, it is necessary to isolate a particular section of pipe for a substantial time. In addition, isolation of piping may be required for maintenance matters and safety considerations. Often times during pressurization for inspections, faucets have not been installed yet, and piping must therefore be capped to prevent pipe contents, water, from exiting the pipes. After inspection, the capping must be removed in order to mount plumbing fixtures and/or faucets thereon.

Prior art teaches welding an end-cap onto plumbing ends. This is a laborious task that requires welding equipment for mounting and removing the end-caps.

Applicant believes that one of the closest references corresponds to U.S. Pat. No. 6,062,263, issued on May 16, 2000 to Donovan, et al. for a thread-forming pipe plug. However, it differs from the present invention, because Donovan et al. teaches a combination plug and fastener for sealing in an opening in a work piece. The combination plug and fastener includes a shank having a non-helical sealing portion and a threaded portion extending from the sealing portion. The threaded portion initially enters the opening, and engages with the internal circular wall of the opening providing a first seal. The sealing portion is configured to engage against the internal wall of the opening providing a second seal.

Applicant believes that another reference corresponds to U.S. Pat. No. 658,313, issued on Sep. 18, 1900 to J. A. Bernardi for a combined pipe cap and plug. However, it differs from the present invention, because Bernardi teaches a combined pipe cap and plug being formed in one piece of suitable metal and susceptible of being turned on or screwed into the end of a pipe or pipe-fitting. It comprises a portion having a threaded socket tapered or gradually reduced in diameter from its outer to its inner end, and a comparatively small portion B of circular form in cross-section exteriorly threaded and tapered from a point adjacent to the portion A, to its outer end.

Applicant believes that another reference corresponds to U.S. Pat. No. 888,683, issued on May 26, 1908 to A. Andrews for a pipe closure. However, it differs from the present invention, because Andrews teaches a hollow pipe-closing plug provided with a longitudinal groove, and a wall of which is convex on an inner side of the plug. The hollow pipe-closing plug is provided with an external screw thread, a longitudinal groove, and a wall of which is convex on the inner side of said plug, and a head for receiving a wrench.

Applicant believes that another reference corresponds to U.S. Pat. No. 2,801,023, issued on Jul. 30, 1957 to Baker et al. for a closure unit. However, it differs from the present invention, because Baker et al. teaches a closure structure for a pipe having an enlarged end with a cylindrical internal surface terminating at an inner end in an internal shoulder, an internal circumferential groove adjacent to an outer end of a cylindrical surface, and a ferrule having a substantially cylindrical internal surface and having an outer surface tapering outwardly and towards the center thereof and disposed in the enlarged end of the pipe. The ferrule is internally threaded and has an external diameter, substantially less than the inside diameter of the pipe end. A lower end of the ferrule rests on an internal shoulder. The ferrule has axially extending grooves in the outer periphery thereof.

Other patents describing the closest subject matter provide for a number of more or less complicated features that fail to solve the problem in an efficient and economical way. None of these patents suggest the novel features of the present invention.

SUMMARY OF THE INVENTION

A compression plug system for plumbing, comprising a plumbing pipe having an external wall, and at least first and second ends. A slip nut has an external wall, and third and fourth ends. Extending from the third end of the slip nut is an internal threaded portion that extends to an internal peripheral flange. The internal peripheral flange extends to the fourth end. The internal peripheral flange defines an opening. The external wall extends approximately a same longitudinally distance as the internal threaded portion. A seal ring comprises a body and an internal wall. Angularly extending from the body are first and second ledges. The internal wall has a first cooperative dimension to receive the first end of the pipe therethrough. A plug comprises a head having a closed end, and an external threaded portion having an edge. Extending from the head is the external threaded portion that extends to the edge. The external threaded portion has a second cooperative dimension to engage with the internal threaded portion of the slip nut. The plug also has an internal wall that extends from the edge until an internal end. The plug further comprises an opening defining a cavity therein that reaches the internal end. The internal wall has substantially a same diameter as the internal wall of the seal ring. The opening has a third cooperative dimension to snugly receive the pipe therethrough. The seal ring is made of a malleable and/or ductile metal.

The compression plug system for tubes and pipes is assembled by mounting the slip nut onto the pipe by passing the opening over the first end of the pipe, then sliding the seal ring thereon, then mounting the plug onto the pipe and screwing it on with a sufficient force to compress the seal ring in between the edge and the internal peripheral flange, thus creating an impermeable seal without the aid of a sealing compound or weld. The sufficient force compresses the seal ring in between the edge and the internal peripheral flange to fill in cavities within the internal threaded portion to create the impermeable seal. Once the plug is removed, the seal ring is kept in place and a faucet may be installed onto the pipe, the slip nut, and the seal ring.

It is therefore one of the main objects of the present invention to provide a compression plug system for tubes and pipes of easy installation and removal, without causing damage to plumbing tubes and pipes.

It is another object of this invention to provide a compression plug system for tubes and pipes that provides a secure seal for pressurization testing.

It is another object of this invention to provide a compression plug system for tubes and pipes that can be used to cap tubing and/or piping, temporarily or permanently, in order to prevent tube or pipe contents from escaping.

It is another object of this invention to provide a compression plug system for tubes and pipes that can be used to cap tubing and/or piping, temporarily or permanently, in order to prevent foreign matter from entering the tubing and/or piping.

It is another object of this invention to provide a compression plug system for tubes and pipes comprising a plug that works in combination with a pipe, slip nut, and a seal ring.

It is another object of this invention to provide a compression plug system for tubes and pipes that provides an impermeable plug without the use of sealing compounds.

It is another object of this invention to provide a compression plug system for tubes and pipes that provides an impermeable plug without welding.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
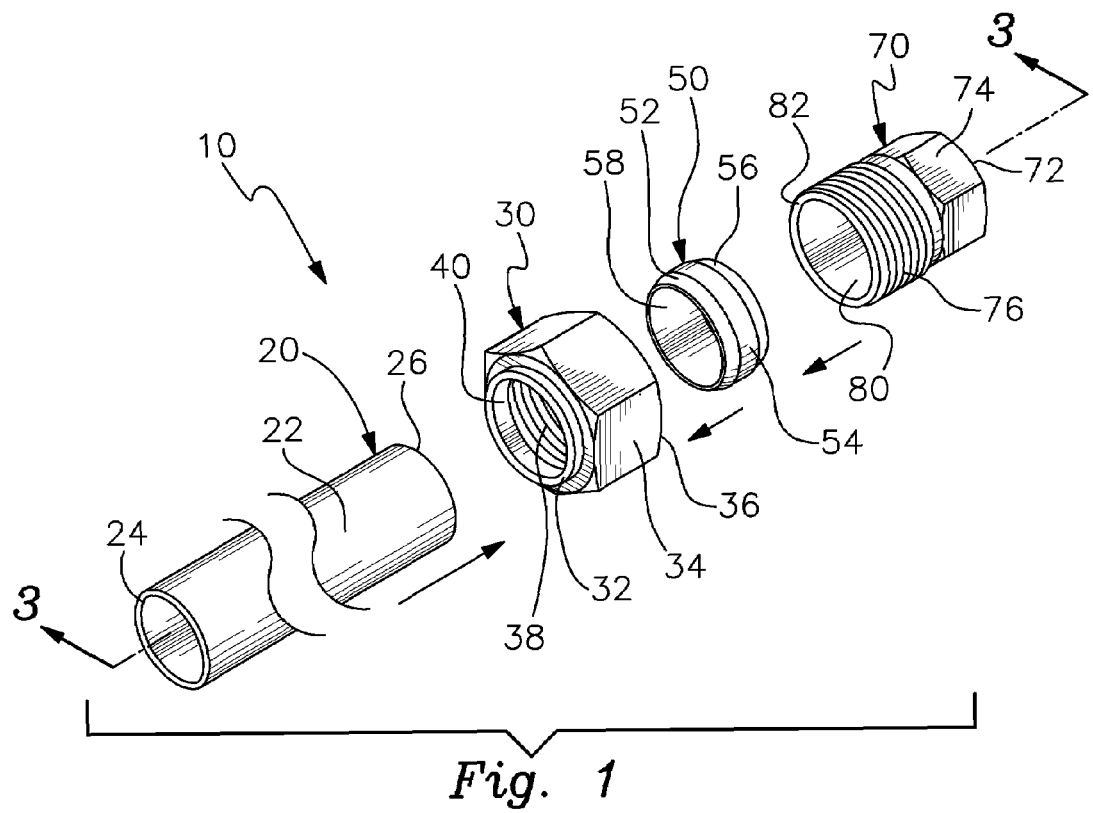
FIG. 1 represents an exploded view of the compression plug system for tubes and pipes, object of the instant invention.

Referring now to the drawings, the compression plug system for tubes and pipes of the present invention is generally referred to with numeral 10. It can be observed that it basically includes plug 70 used in combination with pipe 20, slip nut 30, and seal ring 50.

As seen in FIGS. 1, 2, 3, and 4, pipe 20 is any standard pipe or tube, such as that used in plumbing for buildings, dwellings, or structures. Pipe 20 comprises external wall 22 and ends 24 and 26.

Figure 3:
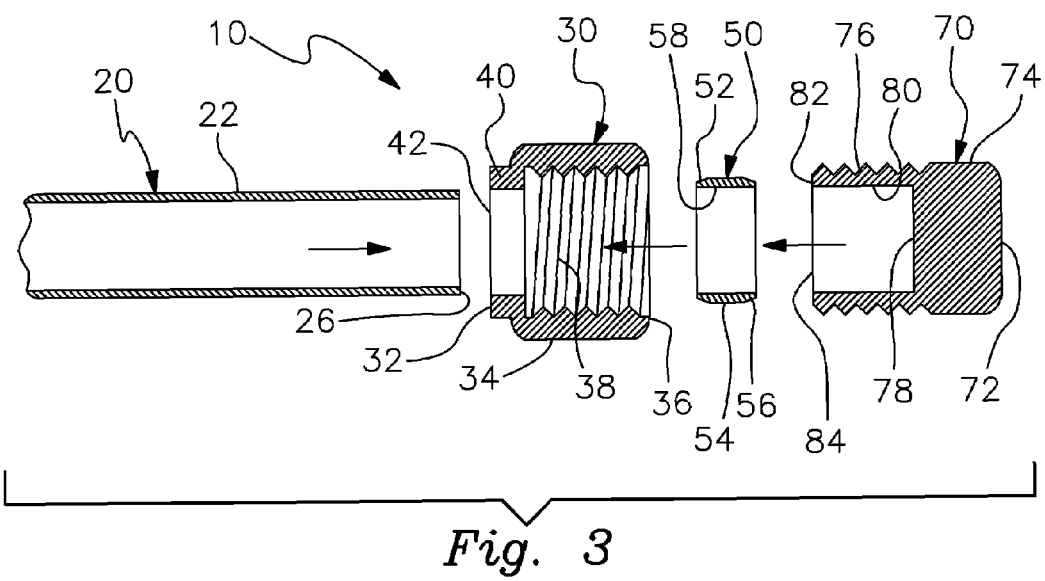
FIG. 3 is a cross section view of the instant invention taken along line 3-3 from FIG. 1.

Slip nut 30 has external wall 34 and ends 32 and 36. Internal threaded portion 38 extends from end 36 up to internal peripheral flange 40, and internal peripheral flange 40 extends to end 32. As best seen in FIG. 3, opening 42 is defined by internal peripheral flange 40 and has a cooperative dimension to snugly receive pipe 20 therethrough. External wall 34 extends the same longitudinally distance as internal threaded portion 38.

Figure 4:
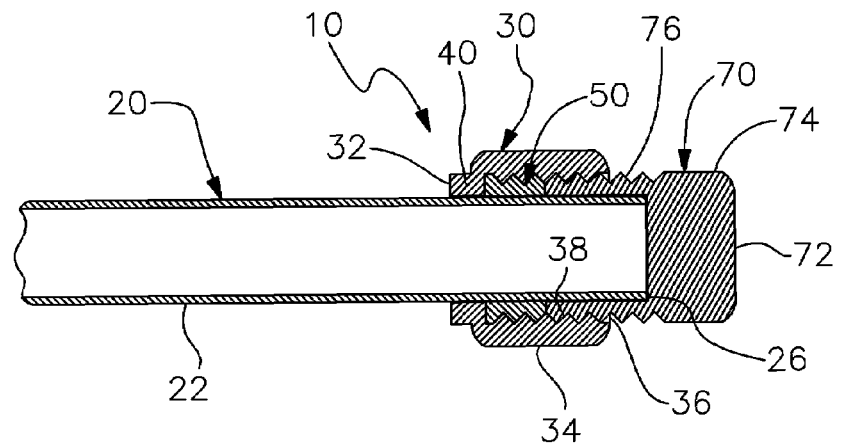
FIG. 4 is a cross section view of the instant invention taken along line 4-4 from FIG. 2.

Seal ring 50 comprises body 54. Angularly extending from body 54 are ledges 52 and 56. As best seen in FIG. 4, internal wall 58 has a cooperative dimension and shape to receive end 26 of pipe 20 therethrough. Seal ring 50 is made of a malleable and/or ductile metal such as copper, lead or alloy thereof, or any other material having similar characteristics.

Plug 70 comprises closed end 72 at head 74. Extending from head 74 is external threaded portion 76 that extends to edge 82. As best seen in FIG. 4, external threaded portion 76 has a cooperative dimension and shape to engage with internal threaded portion 38 of slip nut 30. Plug 70 also has internal wall 80 that extends from edge 82 until internal end 78. As best seen in FIG. 3, plug 70 comprises opening 84 defining a cavity therein that reaches internal end 78. Internal wall 80 has substantially the same diameter as internal wall 58 of seal ring 50.

To assemble compression plug system for tubes and pipes 10, a user mounts slip nut 30 onto pipe 20 by passing opening 42 over end 26 of pipe 20. The user then slides seal ring 50 thereon. The user then mounts plug 70 onto pipe 20 and screws it on with a sufficient force to compress seal ring 50 in between edge 82 and internal peripheral flange 40, thus creating an impermeable seal without the aid of a sealing compound or weld.

In the preferred embodiment, seal ring 50 is made of a malleable and/or ductile metal. When the sufficient force compresses seal ring 50 in between edge 82 and internal peripheral flange 40, it fills in the cavities within internal threaded portion 38 to create the impermeable seal.

Figure 2:
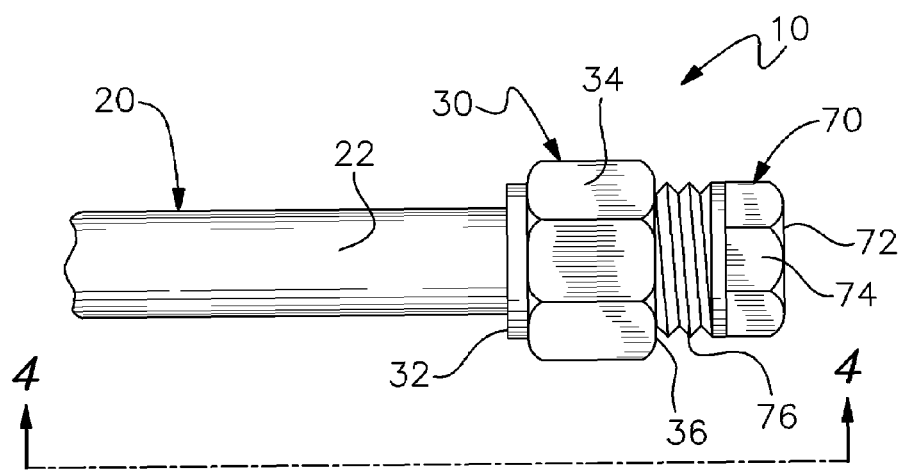
FIG. 2 is a front view of the instant invention assembled.

As seen in FIGS. 2 and 4, instant invention 10 is in position so that the plumbing system can be pressure tested for leaks. While waiting for inspection results, and other structural construction requirements, instant invention 10 may remain mounted thereon to prevent pipe 20 contents from escaping and to prevent foreign matter from entering pipe 20.

Figure 5:
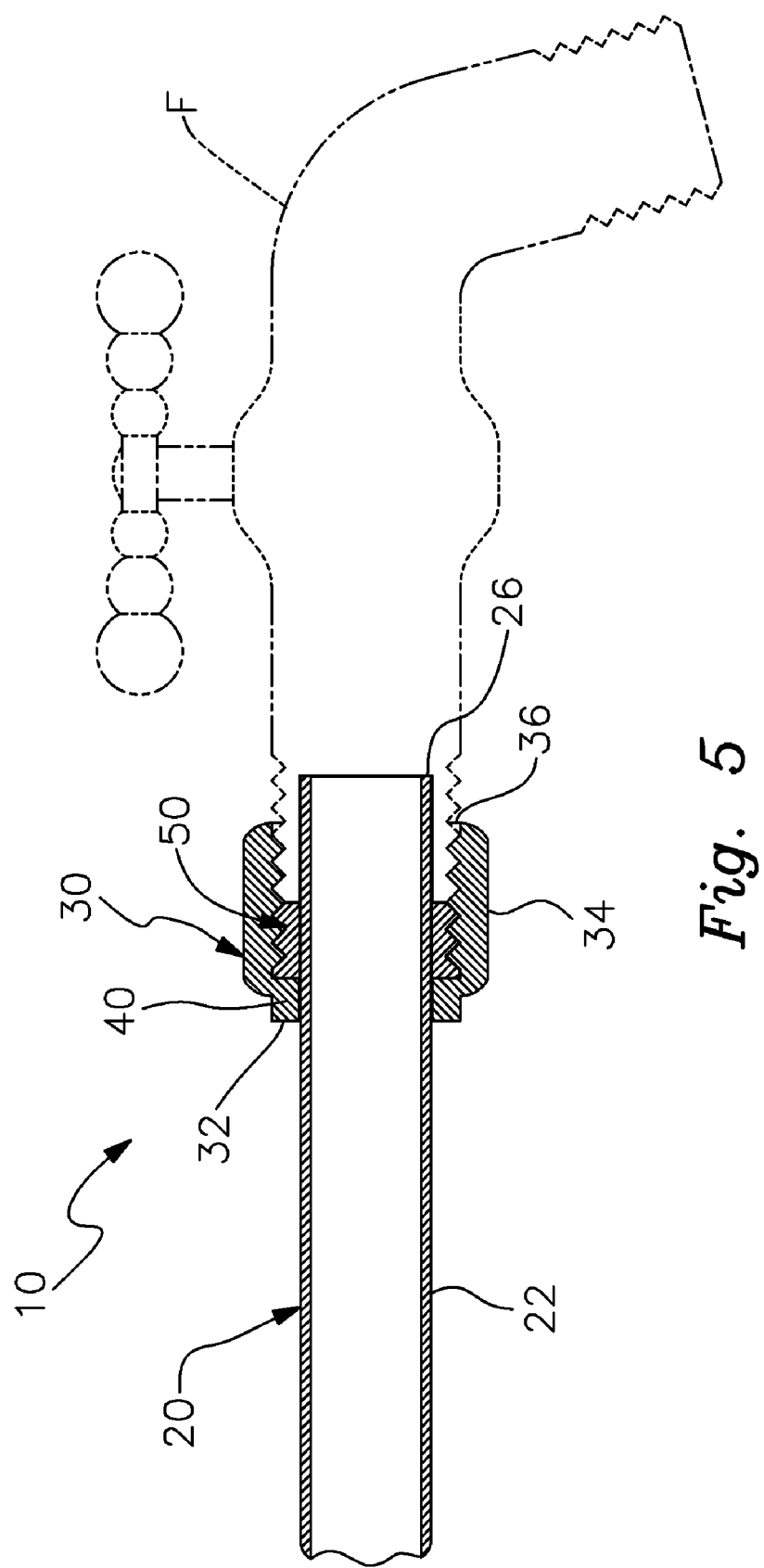
FIG. 5 is the cross section view represented in FIG. 4, showing a faucet installed once the plug is removed.

Once the user removes plug 70, seal ring 50 is kept in place and a faucet F may be installed onto pipe 20, slip nut 30, and seal ring 50, as shown in FIG. 5.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A compression plug system for plumbing, consisting of:
   A) a plumbing pipe (20) consisting of external wall (22), end (24) and end (26);
   B) a slip nut (30) consisting of external wall (34), end (32), and end (36), extending from said end (26) is an internal threaded portion (38) that extends to an internal peripheral flange (40), said internal peripheral flange (40) extends to said end (32), said internal peripheral flange (40) defines an opening (42), said external wall (34) extends approximately a same longitudinally distance as said internal threaded portion (38), said opening (42) has a third cooperative dimension to snugly receive said pipe (20) therethrough, said slip nut (30) mounted directly onto said plumbing pipe (20);
   C) a seal ring (50) consisting of a body (54) and an internal wall (58), angularly extending from each end of said body (54) are ledge (52) and ledge (56) of equal length, said internal wall (58) has a first cooperative dimension to receive said end (26) of said pipe (20) therethrough, said seal ring (50) is made of a malleable and ductile metal; and
   D) a plug (70) consisting of a head (74) having closed end (72) and an external threaded portion (76) having edge (82), extending from said head (74) is said external threaded portion (76) that extends to said edge (82), said external threaded portion (76) has a second cooperative dimension to engage with said internal threaded portion (38) of said slip nut (30), said plug (70) also has an internal wall (80) that extends from said edge (82) until an internal end (78), said plug (70) further consists of an opening (84) defining a cavity therein that reaches said internal end (78), said internal wall (80) has substantially a same diameter as said internal wall (58) of said seal ring (50), said seal ring (50) deforming as said external threaded portion (76) engages with said internal threaded portion (38) of said slip nut (30), said compression plug system for tubes and pipes (10) is assembled by mounting said slip nut (30) onto said pipe (20) by passing said opening (42) over said end (26) of said pipe (20), then sliding said seal ring (50) thereon, then mounting said plug (70) onto said pipe (20) and screwing it on with a sufficient force to compress said seal ring (50) in between said edge (82) and said internal peripheral flange (40), thus creating an impermeable seal without the aid of a sealing compound or weld, said sufficient force compresses said seal ring (50) in between said edge (82) and said internal peripheral flange (40) to fill in cavities within said internal threaded portion (38) to create said impermeable seal, further characterized in that upon removal of said plug (70), said seal ring (50) is kept in place and a faucet F may be installed onto said pipe (20), said slip nut (30), and said seal ring (50).

* * * * *